United States Patent
Keaveny

(10) Patent No.: US 6,308,147 B1
(45) Date of Patent: Oct. 23, 2001

(54) DATA STRUCTURE SYNTHESIS IN HARDWARE USING MEMORY TRANSACTION TRANSLATION TECHNIQUES

(75) Inventor: Thomas A. Keaveny, Auburn, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/083,371

(22) Filed: May 21, 1998

(51) Int. Cl.$^7$ .................................................... G06F 9/455
(52) U.S. Cl. .................................... 703/25; 710/4; 711/6; 711/203
(58) Field of Search .................................. 395/500, 38, 34, 395/847, 846, 5; 711/365, 203, 202, 132, 133, 136, 170, 171, 207, 6; 703/25; 709/221, 1; 716/18

(56) References Cited

U.S. PATENT DOCUMENTS

| | | | |
|---|---|---|---|
| 4,607,331 | * 8/1986 | Goodrich, Jr. et al. | 711/136 |
| 5,247,690 | * 9/1993 | Fain | 379/5 |
| 5,283,876 | * 2/1994 | Tague | 711/207 |
| 5,341,495 | * 8/1994 | Joyce et al. | 710/105 |
| 5,375,248 | * 12/1994 | Lemay et al. | 713/600 |
| 5,446,843 | * 8/1995 | Fucito et al. | 709/221 |
| 5,491,640 | * 2/1996 | Sharma et al. | 716/18 |
| 5,502,833 | * 3/1996 | Byrn et al. | 711/132 |
| 5,537,571 | * 7/1996 | Deville | 711/133 |
| 5,568,635 | * 10/1996 | Yamaguchi | 711/171 |
| 5,581,736 | * 12/1996 | Smith | 711/170 |
| 5,586,283 | * 12/1996 | Lopez-Aguado et al. | 711/207 |
| 5,983,332 | * 11/1999 | Watkins | 711/202 |

OTHER PUBLICATIONS

Wiu and Dubois, Options for Dynamic Address Translation in COMAs, IEEE 1063–6897/98, pp 214–225.*
The IEEE Standard Dictionary of Electrical and Electronics Terms, IEEEStd 100–1996, pp. 1040.*
Merriam–Webster's Dictionary 10th Edition pp. 28 and 103.*
Textbook 'Data Structure Techniques' (Thomas A. Standish) 1941, pp 20–32.*
Textbook 'Digital Design' (M. Morris Mano) 1984, pp 305–307.*

* cited by examiner

Primary Examiner—Russel W. Frejd

(57) ABSTRACT

The inventive mechanism synthesizes complex software data structures in hardware by using memory transaction translation techniques. The mechanism includes a finite state machine and a bus controller. The state machine has a specific algorithm that defines the dynamic behavior of the synthesized structure. The bus controller manipulates memory control strobes and communicates to the memory bus and bridge. When a transaction references the data structure, the inventive mechanism processes the address of the request into a new address based upon the state of the structure. The finite state machine tracks the current state of the structure and calculates the new state or address. The mechanism the sends out the new address, which is processed by the memory device. The inventive mechanism can also manipulate the read and write aspects to transactions, in addition to the address aspects of the original transaction. For instance, a write transaction could be transformed into a read modify write locally to the memory. This type of operation would allow the construction of complex structures such as link lists and semaphores, in addition to FIFOs, and LIFOs.

17 Claims, 2 Drawing Sheets

DATA STRUCTURE SYNTHESIS IN HARDWARE USING MEMORY TRANSACTION TRANSLATION TECHNIQUES

REFERENCE TO RELATED APPLICATIONS

The present application is being concurrently filed with commonly assigned U.S. patent application, Ser. No. 09/083,370 entitled "MECHANISM FOR MAINTAINING REVISIONS OF OBJECTS IN FLASH MEMORY", the disclosure of which is incorporated herein by reference; and concurrently filed with commonly assigned U.S. patent application, Ser. No. 09/082,738 entitled "HIGH PERFORMANCE, NETWORK/BUS MULTIPLEXER ARCHITECTURE", the disclosure of which is incorporated herein by reference.

TECHNICAL FIELD OF THE INVENTION

This application relates in general to software data structures and in specific to a mechanism for synthesizing software data structures in hardware using memory transaction translation techniques.

BACKGROUND OF THE INVENTION

The basic concept of memory transaction translation is commonly used in modern computing systems. The translation process typically involves the replacement of a memory address, and is based on a masking and table lookup operation. For example, memory management software or hardware is often used to take an original virtual memory page address, and replace a portion of it with a value that results in a physical memory address. The replacement is based on a page table entry, as indexed by the virtual address. This is illustrated in FIG. 5. Virtual memory translation is used to provide the illusion that more memory is accessible than actually exists. Virtual memory translation is also used to effect the various types of swapping techniques and caching algorithms. Bus converters or bus bridging circuits typically implement a restricted version of translation to allow address translation between the two busses that they connect.

FIG. 5 depicts a prior art translation mechanism 50. A memory address is placed onto memory bus 51 by a processing element (not shown). Mechanism 50 would recognize that the address is a virtual address, which would have to be translated into a physical address which actually exists. The mechanism 50 may operate to replace a certain number of address bits with other address bits, or the entire address may be replaced with a different address, similar to content addressable memory. The address is captured by the address in buffer 52 from memory bus 51. This address is used to reference a new address or a portion of a new address in page mapping table 53. Table 53 may have one or more entries, which are indexed by the address. This address is also combined by and 55 with a mask 54. This combination will mask off a portion of the address or possibly the entire address. The remaining portion, if any, if combined by or 56 with the new address portion from table 53 to form the new address. This new address is sent to address out buffer 57, which will then place the new address onto memory bus 51. The new address will associate a physical memory location (not shown) with the request from the processing element. Note that when the table 53 is used in a bridge, typically the table has one entry, and the address in 52 is then translated into some other address 57 for use in a different bus domain.

One problem with the prior art translation mechanism 50 is that the translation function is relatively static. The translation table 53 tends to remain unchanged for long periods of time, as the mapping schemes are complex and time consuming from a processor point of view. Thus, re-mapping of the tables 53 is relatively prohibitive. The tables are typically initialized at one point during operations and are changed infrequently if at all. For example, tables for bus bridges are initialized during power on or a system reset, and are not changed until a major reconfiguration event occurs. The table is re-mapped by interrupting the processing element, and blocking the bus and bridge. The processor then re-maps or updates the table. Thus, the processor will be operating on the table and not on other duties, and the bridge will not be managing the bus. Therefore, re-mapping the table requires an investment of a significant amount of processing resources, as well as lost bridge access time. The prior art address translation mechanism cannot serve in a dynamic environment.

For example, consider the operation of the prior art translation mechanism on FIFO or queue data structure. A FIFO, from a virtual memory address perspective, has either one or two addresses, where the read and write addresses may be the same or different. Writing to the FIFO address adds elements to the FIFO, while reading removes elements from the FIFO. Thus, each time an element is added to the FIFO, the next available physical address of the FIFO for a write is the current address plus one. Similarly, each time an element is removed from the FIFO, then next address for a read is the current address minus one. Thus, the actual physical address to be generated is dependent upon the state of the FIFO. After each operation or access to the FIFO, the hardware memory management unit (MMU) would need to interrupt the main processing element, so that its paging information could be updated, such that it would point to the next FIFO element. Thus, each access to the FIFO would require the processor to update the tables. This greatly reduces the efficiency of the processor, and makes each access to the FIFO very costly in terms of processor time.

Furthermore, note that the translation function only operates on the address phase of the transaction. Thus, the MMU would somehow need to recognize the existence of FIFO boundary conditions, i.e. full or empty. This also includes having a mechanism for informing an accessing device or processing element that their requested transaction cannot be completed until the boundary conditions are satisfied. Thus, prior art translation mechanism is insufficient to handle the dynamic translation required for the emulation of complex data structures.

Therefore, there is a need in the art for a mechanism which permits dynamic memory transaction translation such that complex data structures can be emulated or synthesized by software.

SUMMARY OF THE INVENTION

These and other objects, features and technical advantages are achieved by a system and method which uses a mechanism to synthesize complex software data structures in hardware with memory transaction translation techniques. The resultant emulated data structures provide versatile, performance enhancing programming resources.

The inventive mechanism performs enhanced memory transaction translation by using a finite state machine instead of a translation table, and manipulates the bus control primitives outside of the address phase, in order to manipulate memory control strobes and communicate to the memory bus and bridge. Note that the inventive mechanism is described in terms of emulating a FIFO structure, however, this structure is by way of example only, as other types of structures could be synthesized via the inventive mechanism, for example, queues FILOs, LIFOs, stacks, semaphores, link lists, scatter/gather structures, and other structures. Since the mechanism is dynamic instead of static in nature, then the state machine can include a specific algorithm that defines the dynamic behavior of the synthesized structure.

The operation of software data structures is synthesized or emulated in standard memory by altering the address. The inventive mechanism synthesizes the operation via dynamic memory translation which modifies the address of the original transaction based on a algorithm. When a transaction references the virtual structure, the inventive mechanism processes the address of the request into a new address based upon the state of the virtual structure. A finite state machine is used by the inventive mechanism to track the current state of the structure and calculate the new state or address. The mechanism then sends out the new address, which is processed by the memory device. Note that the prior art would always supply the same address, however the inventive mechanism will provide an address based upon the current state of the virtual structure.

For example, the virtual structure is a virtual FIFO. Thus, memory requests to the FIFO will only reference the FIFO and not to a particular location in the FIFO. The inventive mechanism would track the current status of the FIFO and route read/write requests to the appropriate locations within the FIFO. Note that the inventive mechanism operates without using processor resources.

The inventive mechanism can also manipulate the read and write aspects of transactions, in addition to the address aspects. For instance, a write transaction could be transformed into a read modify write locally to the memory. This type of operation would allow the construction of complex structures such as link lists and semaphores.

Therefore, it is a technical advantage of the invention to dynamically translate memory addresses based on the state of a virtual construct or structure using the inventive transaction translation mechanism.

It is another technical advantage of the invention to use a state machine in the inventive transaction translation mechanism to track the current state of the virtual construct and calculate a subsequent state.

It is a further technical advantage of the invention to use bus primitives to control the memory and common buses to replace a virtual address with a physical address, and to satisfy boundary conditions of the virtual constructs.

It is a further technical advantage of the invention to synthesize virtual data structures in hardware using the inventive transaction translation mechanism.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The inventive enhanced memory transaction translation mechanism 11 described herein uses a finite state machine to dynamically translate addresses and manipulate the bus control primitives outside of the address phase.

Figure 1:
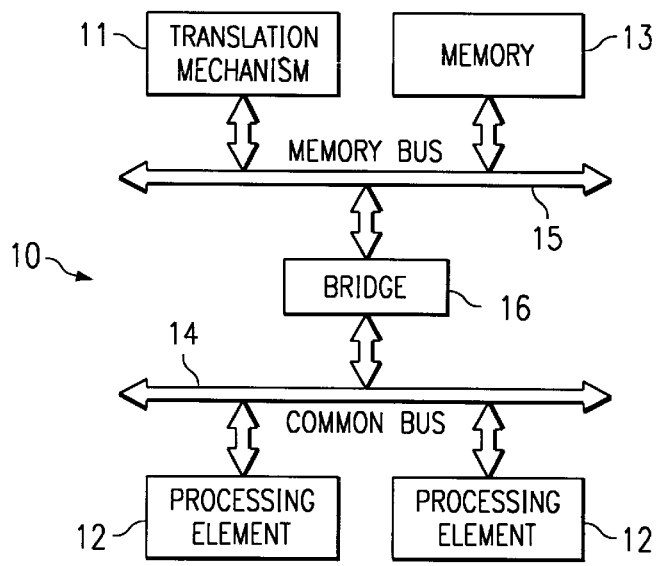
FIG. 1 depicts a system that includes the inventive translation mechanism.

FIG. 1 depicts the inventive mechanism 11 in system architecture 10. The system 10 includes processing elements 12, which are capable of performing memory operations such as reads or writes, on memory 13. Note that the processing elements 12 are isolated from memory 13 by bridge 16. Processing elements communicate with each other and the remainder of the system 12 via common bus 14. Memory 13 communicates with other memory elements (not shown) and the inventive mechanism 11 via memory bus 15. Bridge 16 interconnects the common bus 14 and the memory bus 15. Note that memory 13 would include a memory controller which resides between RAM memory and the memory bus 15.

For a normal, untranslated memory operation, a processing element 12 will initiate a memory operation or transaction on the common bus 14. The bridge 16 will recognize the operation as destined for memory, and will forward the transaction to the memory bus 15. The memory controller of memory 13 will receive the transaction, and then perform the appropriate operation, either read or write the data as per the transaction request. If data needs to be returned, it will be returned via the memory bus 15 through the bridge 16, onto the common bus 14, and then to the requesting processing element 12.

For a virtual memory operation, or other operation which requires translation of the memory address, a processing element 12 will again initiate the virtual memory operation on the common bus 14. The bridge 16 will recognize the operation as destined for memory and requiring translation, and will forward the transaction to the memory bus 15. The memory controller recognizes that this is an address to a location which it does not handle, and thus waits for resolution of the translation. The translation mechanism 11 recognizes this transaction as one containing an address that must be translated. The mechanism 11, having been signaled by bridge 16, will activate one of its internal finite state machines, based on that address. The mechanism 11 will calculate a new address and place this new address onto the memory bus 15. Note that the mechanism 11 reforms or modifies the original transaction with the new address. A set of handshake signals between the bridge 16 and mechanism 11 allow the new address to be placed on the bus. The mechanism will signal the devices attached to the memory bus 15 that the new address is available. The memory controller of memory 13 will receive the reformed or modified transaction, and then perform the appropriate operation, either read or write the data as per the transaction request. If data needs to be returned, it will be returned via the memory bus 15 through the bridge 16, onto the common bus 14, and then to the requesting processing element 12.

Note that the actual new or translated address that is placed on the memory bus 15 is based on a specific algorithm of the particular finite state machine. For example, suppose system 10 is using a virtual FIFO structure which is stored in memory 13, and the current address of the FIFO is 2. The algorithm models appropriate behavior of a physical FIFO, for example, linear sequential addressing or a Gray code. Thus, if element 12 issues a write to the FIFO, then the state machine will translate the request address to 3. Note that processing element 12 would only issue a write to the FIFO, and not to a particular space or state of the FIFO. Note that other algorithms could be used such as linear feedback shift register.

Figure 2:
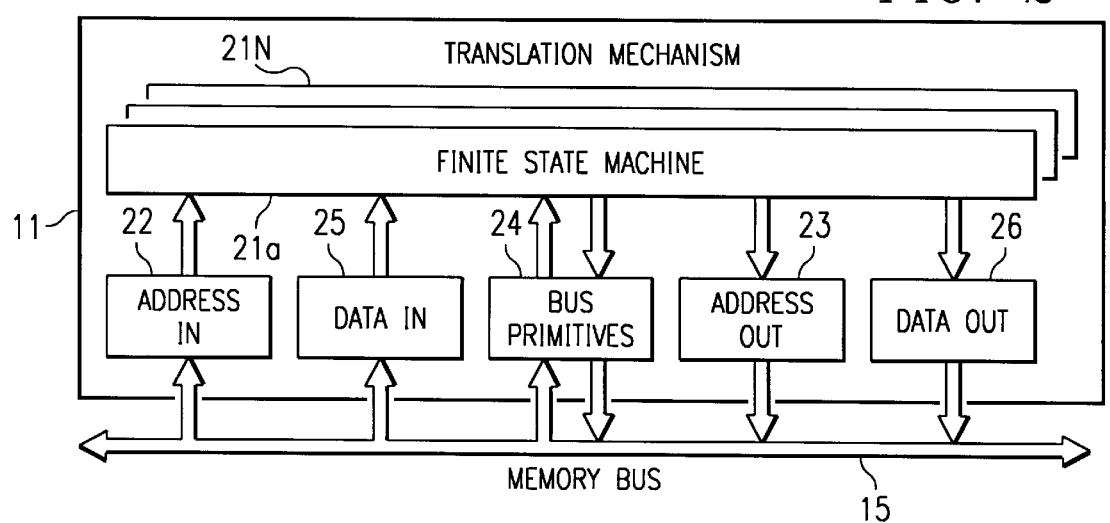
FIG. 2 depicts the internal arrangement of the inventive translation mechanism.
Figure 5:
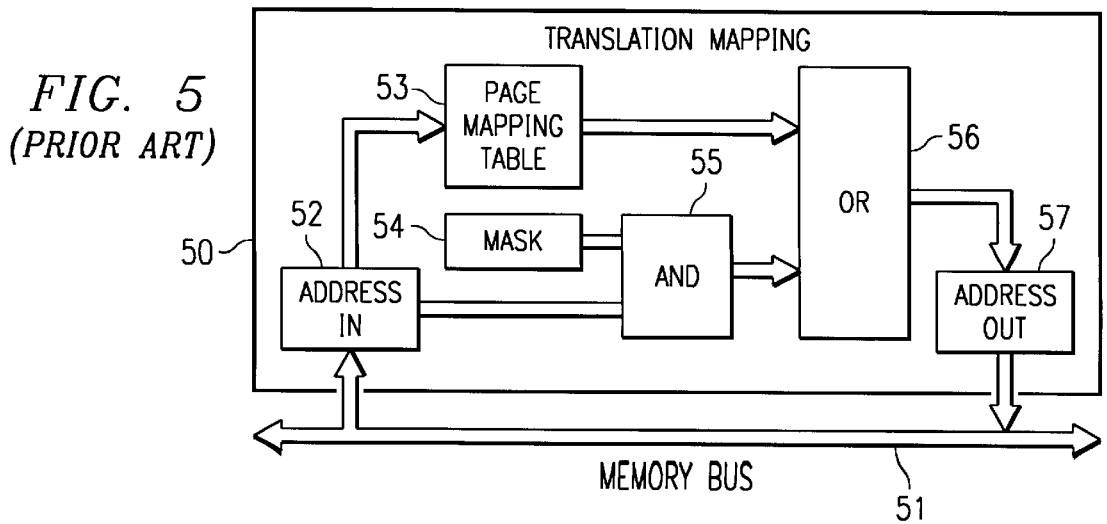
FIG. 5 depicts a prior art address translation mapping mechanism.

FIG. 2 depicts the inventive transaction mechanism 11. The mechanism 11 includes one or more finite state machines (FSM) 21a–21N that are mapped to the common bus address region. It also contains bus primitive control block 24 that can manipulate the memory control strobes and communicate to the bridge 10. The processing element 12 issues a transaction which is recognized by bridge 16 as targeted for memory 13. Bridge 16 recognizes that an translation operation needs to occur, forwards the address and the transaction type (e.g. read or write) to the memory bus 15, and alerts the translation mechanism 11 that the address requires translation. Alternatively, the translation mechanism 11 samples each memory operation from bridge 16 and determines which operations to translate. The address is captured by address in buffer 22. The translation mechanism 11 notes the address for the transaction and activates the appropriate FSM block 21a–21N for processing. A decoder (not shown) selects the FSM block 21 from the address in the address in block 22. The bridge 16 removes the original address from the memory bus 15.

The FSM 21 determines how the transaction is to be modified. The FSM 21 calculates a new address, and places into address out buffer 23 by bus controller or bus primitives 24. The address is then sent out onto the memory bus 15 and a signal is sent to the bridge 16 which indicates that the original transaction can continue with the modified address. In more complex FSM algorithms, the translation mechanism could perform any number of hidden memory operations using its bus primitives 24, prior to allowing the original transaction to complete. If the common bus 14 supports some form of busy or retry facility, it may also choose to temporarily reject access to the original memory location, or to disconnect an operation that is active. Note that the actual physical address is not delivered back to the processing element, unless some processing aspect requires the physical address.

As shown in FIG. 2, there are a plurality of FSMs 21a–21N. Each state machine is preformed for a particular virtual construct. Each of FSM could be for a different type of construct, e.g. one FSM for a FIFO, another FSM for a LIFO, etc. Also, each FSM could be for a different specific construct, e.g. one FSM for a first FIFO, another FSM for a second FIFO, etc. Moreover, the plurality could include multiple constructs of different types, e.g. one for a first FIFO, one for a second FIFO, one for a LIFO, etc. Each FSM would correspond to a particular virtual address. Each FSM could have a different algorithm indicating a different type of construct (e.g. FIFO or LIFO), or different characteristics of similar types of constructs (e.g. 128 entry FIFO and 64 entry FIFO would have different boundary conditions, and may have different physical memory addressing characteristics).

The bus primitives 24 are the control signals or handshake signals that are used to control the operation of the memory bus 15. One set of bus primitive signals is used by the translation mechanism 11 to temporarily take over the memory bus 15, and replace the original address with a new one. Other sets of bus primitives would allow the translation mechanism to perform other bus operations such as the performance of read and write operations on that memory bus. Return signals from the memory bus 15 would inform the bus primitives block 24 that control has been granted, and would activate the decoder. The handshake signals allow the bridge to put the memory bus in a high impedance state to allow the translation mechanism to override the original address.

The data in block 25 and the data out block 26 allow for data to be sent to and delivered from the FSMs 21. For example, the data out block 26 would allow the translation mechanism to report the actual physical address or state back to the processing elements on the common bus 14. The data in block 25 could be used to manage the translation mechanism, e.g., initialize, program, acknowledge, interrupts, reset, or to make other changes based upon external events. The data in block 25 could also be used to create structures with checksums or CRC elements by calculating a check code based on the data written to a given protected structure.

Figure 3:
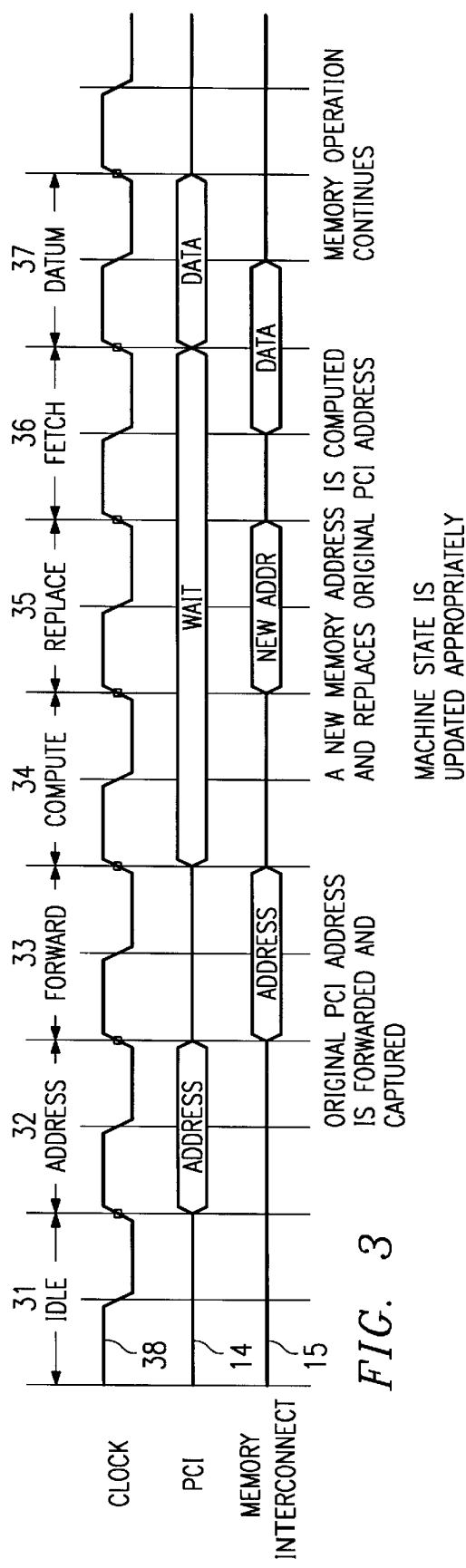
FIG. 3 depicts the general transaction flow of the inventive mechanism of FIG. 2.

FIG. 3 depicts the general transaction flow or the flow of information between the common bus 14 or PCI bus and the memory bus 15 or memory interconnect, via the transaction mechanism 11. Note that a general page mapping operation would proceed in a similar fashion. The flow begins with an idle state 31, where there is no activity on the buses. Next, there is an address state 32, wherein the originator of the memory transaction deposits an address on the common bus 14. The bridge 16 forwards the address onto the memory interconnect 15 and activates the translation mechanism during the forwarding state 33. In the compute state 34, which may take one or more cycles of clock 38 depending on the actual scope of the computation, the translation mechanism will activate the appropriate finite state machine after sampling the address from the bus, and then determine the appropriate new address, based on its current state and the address as supplied. In the next state, the replace state 35, the new address is placed onto the memory bus 15, and the devices on the memory interconnect are alerted that the new address is available. The FSM also updates its current state during this state or the compute state. The translation mechanism relinquishes its temporary control of the memory bus and allows the bridge and the memory to sequence through the rest of the transaction, i.e. fetch state 36 and datum state 37. In this example, the data is a single word that is being read from memory. The data associated with that new address is placed on the memory interconnect and then forwarded back to the originator on the PCI bus. Note that the translation mechanism has control of the memory bus during the compute and replace states. Further note that the actual number of clock cycles, as well as the number of states, depend upon the specific system implementing the translation mechanism, as well as the complexity of the software construct being used.

Figure 4:
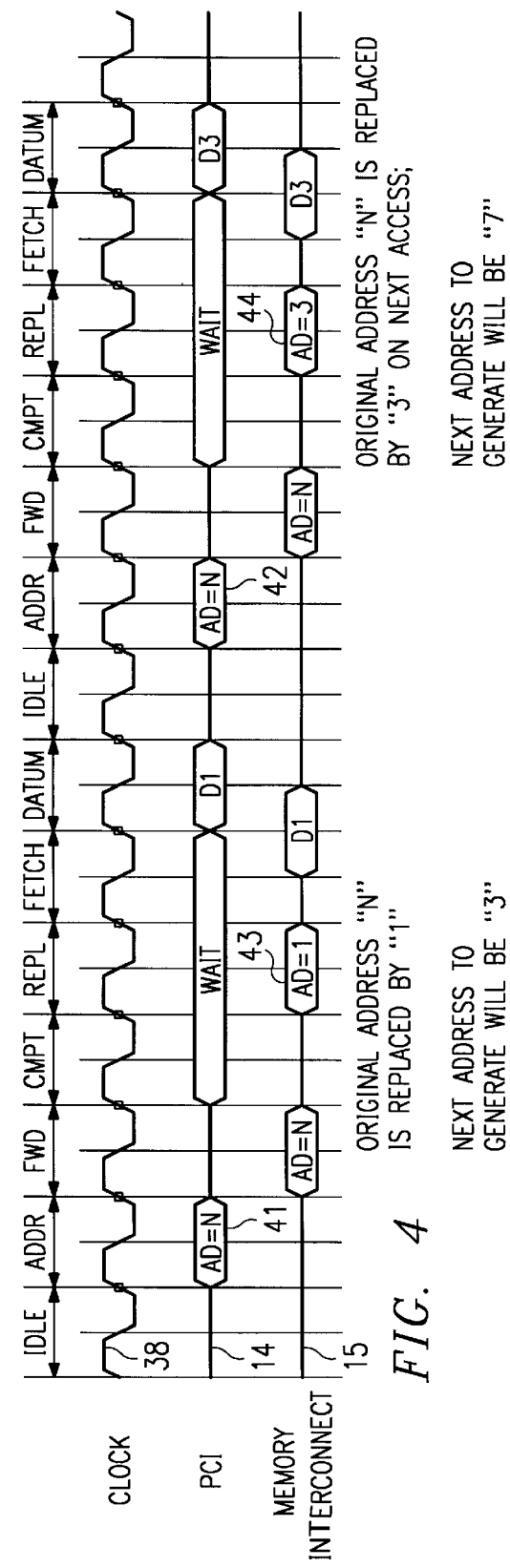
FIG. 4 depicts the state sensitive transaction flow of the inventive mechanism of FIG. 2.

FIG. 4 depicts two transactions which depicts state sensitive translations. Each transaction follows the 7 state flow as shown in FIG. 3. Both of two separate bus transactions are to the same memory region, (e.g., they both invoke the same virtual construct). In other words, each of the addresses 41, 42 placed on the PCI bus 14 are to the same location, N. In the first transaction, the address N is replaced with address 1, as shown by reference numeral 43. The data associated with address 1, D1, is then fetched and sent out over the PCI bus 14. In the second transaction, the address N is replaced with address 3, as shown by reference numeral 44. The data associated with address 3, D3, is then fetched and sent out over the PCI bus 14. Each of the replacement addresses is generated from an algorithm, in this example, 2X+1, thus the current state is multiplied by 2 and incremented by 1 to calculate the new address state. Note that this algorithm is by way of example only.

Different software data structures can be constructed by defining specific FSM algorithms. For example, to create a memory mapped, virtual FIFO or queuing structure, the FSM could be designed to maintain states for a read index and write index. Both indices must be tracked as the producers and consumers of information may be performing at different rates. Note that the addresses are a cyclic sequence, meaning that when the last state is reached, the next state is the first state. A write transaction directed to the virtual FIFO would cause a portion of the original address to be replaced by the write index, and the write index would be incremented appropriately. A read transaction directed to the virtual FIFO would behave similarly, using the read index. If the FIFO became empty or full, the bus primitive control block 24 would force the transaction to terminate or hold, until the FIFO became available again, based on comparison of the indices. Thus, the boundary conditions will be satisfied, and underflow and overflow will not occur.

Construction of a stack data structure or last in first out (LIFO) can also be accomplished. In this case, only a single index needs to be maintained. A write transaction increments the index; a read transaction decrements the index. The translated address would embed the index, as described for the FIFO case. Reaching a stack boundary would result in the appropriate common bus effect, e.g. holding the transaction until the LIFO is available. Note that the stack may be ascending or descending.

By using the extended bus primitive controls, structures such as semaphores can also be constructed by applying the translation techniques to bus transactions. For example, FSM could be programmed to monitor the contents of the data portion of an assisted transaction. If the contents indicate a semaphore grant, the FSM could inject a memory transaction to modify the semaphore contents. This would transform the original semaphore read into a read-modify-write transaction on the memory bus. For a typical semaphore, after an element claims ownership, the contents of that semaphore location is modified so that all subsequent readers will realize that it is currently owned. This modification usually involves a locking mechanism on the memory bus to prevent interruption of the manipulation of that memory location. The inventive mechanism can refer to the translated semaphore prior to returning the data to the device in response to the original read. The translation mechanism can examine the data on the fly and if the data matches what is considered to be semaphore available and about to be consumed, the translation mechanism can immediately modify the associated memory location to indicate that the semaphore is now owned. And after that has been completed, it can proceed to return the semaphore value to the original requestor. Note that in response to the original read, not only is data pulled out, but also an extra write operation is generated in order to satisfy the semaphore algorithm. The device releases the semaphore by writing the cleared semaphore state back in that same area. At this point, the translation mechanism needs to translate the address, if necessary, and put the original data, supplied by the processing elements, in that memory location.

The inventive memory transaction translation mechanism can also be used in the buffer allocation management of intelligent I/O adapters, I/O processors, or intelligent I/O ASICS which have some amount of imbedded intelligence, but not necessarily general purpose processing units. Traditionally I/O buffers (i.e., buffers used by an I/O adapter during an I/O transfer) must be allocated and assigned to a given I/O transfer when the transfer is initiated, from a buffer pool. The I/O transfer is then queued on the I/O adapter. The buffers are then effectively busy, until the I/O is completed. Under heavy I/O workload, this approach consumes both processing bandwidth in the buffer search and assignment, as well as buffer resources, which may only be actually active for a small portion of the time that they are allocated. Thus, this introduces latency into the completion of transactions, due to both of these factors.

In the buffer allocation application of the invention, a virtual FIFO or queue of buffer addresses is provided via the translation mechanism. The I/O adapters are programmed to get their next buffer address from a memory address that corresponds to the virtual FIFO, when they are sourcing data to memory. This allows buffer resources to be allocated at the precise time of need. Buffer resources are replenished by writing their address back into the FIFO, as part of a background process. If the buffer resource becomes exhausted, the I/O adapters are simply held off, until the background process completes. The translation mechanism can interrupt the main processing element if its virtual FIFO of buffer address nears an empty state, via bus primitives. An extra register based port in the translation mechanism manages such events. This could also be performed using the common or PCI bus.

The inventive mechanism can also be used to construct counters. These counters can be used for events, performance monitoring, and tracing. A processing element would directly query the translation mechanism as to the contents of the counter. The processing element would pass the address of the virtual counter, and in response, the translation mechanism would provide the current state of the counter either on the address out block or the data out block. A reference to a different address would cause the mechanism to increment its state by one. Thus, a virtual counter would have two addresses, one to increment and one to read out.

Note that the inventive mechanism would satisfy boundary conditions. The bus primitives allow the indication to the bridge that the translation mechanism is not capable of currently satisfying the requested transaction. This may be because of an underflow condition, overflow condition, watermark has been reached, a specific state has been reached, or that another element is not prepared to participate in the transaction. If the common bus has a retry capability, then the transaction can be deferred until the mechanism is ready to receive the transaction. The common bus would receive an indication that the mechanism is ready. When a boundary condition does occur, the translation mechanism can generate an interrupt. The state machine would activate an interrupt register (not shown) which would indicate, via a line, to the service processor or supervisor processor that the virtual construct is at a boundary condition, e.g. full, empty, or other change of state that will handle the interrupt. Note that the data out buffer could be used as the interrupt register. Moreover, the interrupt could be put out onto the memory bus, and then the bridge could interrupt the common bus, at which point the processing element will service the interrupt.

Although the present invention and its advantages have been described in detail, it should be understood that various changes, substitutions and alterations can be made herein without departing from the spirit and scope of the invention as defined by the appended claims.

What is claimed is:

1. A multiprocessor computer system that includes a virtual structure stored in a memory, wherein the system produces a transaction that references the virtual structure, the system comprising:

a dynamic translation mechanism that translates a virtual address in the transaction to a physical address of the memory based upon a current state of the virtual structure;

a memory bus that interconnects the memory and the dynamic translation mechanism;

a plurality of processors, wherein one of the plurality of processors originated the transaction;

a common bus that interconnects the plurality of processors; and a bridge that interconnects the memory bus and the common bus;

wherein the physical address is passed to the memory via the memory bus, and the memory processes the transaction.

2. The system of claim 1, wherein:

the virtual structure is a FIFO.

3. The system of claim 1, wherein the dynamic translation mechanism comprises:

a state machine that maintains a current state of the virtual structure and calculates the physical address based upon the current state and information in the transaction; and a bus controller that controls an operation of the bus;

wherein the bus controller allows the subsequent state to be placed on to the bus.

4. The system of claim 3, wherein the dynamic translation mechanism further comprises:

a plurality of state machines, wherein each state machine is associated with a particular one of the virtual structures.

5. The system of claim 3, wherein:

the bus controller places a signal on to the bus when a boundary condition of the virtual structure is encountered, whereby the transaction is stalled until the boundary condition is alleviated.

6. A method for processing a virtual memory transaction, the method comprising the steps of:

locating a virtual address to a virtual structure within the transaction;

referencing a state machine based on the virtual address;

calculating a physical address, via the state machine, based upon a current state of the virtual structure;

replacing the virtual address of the transaction with the physical address to form a physical transaction;

placing the physical transaction on to the bus; and programming the state machine with a behavior algorithm which defines an operation of the virtual structure.

7. The method of claim 6, further comprising the step of:

receiving the transaction from a bus.

8. The method of claim 6, further comprising the step of:

selecting the state machine from a plurality of state machines based on the virtual address.

9. The method of claim 8, wherein:

each state machine of the plurality of state machines is associated with a particular virtual structure.

10. The method of claim 6, further comprising the step of:

maintaining a current state of the virtual structure.

11. The method of claim 6, wherein:

the step of calculating is performed according to the behavior algorithm.

12. The method of claim 6, further comprising the step of:

updating the current state of the virtual structure in accordance with the physical address to form an updated state of the structure.

13. The method of claim 6, further comprising the step of:

transferring control of the bus to the state machine, via a bus controller.

14. The method of claim 6, further comprising the step of:

placing a signal on the bus when a boundary condition of the virtual structure is encountered, via a bus controller.

15. The method of claim 14, further comprising the step of:

stalling the transaction until the boundary condition is alleviated, via the signal.

16. The method of claim 6, further comprising the step of:

processing the physical transaction according to the physical address, via a memory.

17. The method of claim 6, wherein the structure is selected from the group consisting of:

a FIFO, a LIFO, a link list, a semaphore, a read transaction, and a write transaction.

* * * * *